United States Patent [19]

Ooms et al.

[11] Patent Number: 5,314,986
[45] Date of Patent: May 24, 1994

[54] PHENOLIC RESINS FROM BISPHENOL A RESIDUAL RESINS AND MIXTURES OF CHLORO-SUBSTITUTED HYDROCARBONS, AND THE USE OF SPECIFIC PHENOLIC RESINS AS HOMOGENIZERS FOR RUBBER VULCANIZATES

[75] Inventors: Pieter Ooms; Heinrich Schrage; Hans-Josef Buysch, all of Krefeld; René Loix, Leimen; Hans-Joachim Graf, Manheim, all of Fed. Rep. of Germany

[73] Assignee: Bayer Aktiengesellschaft, Leverkusen, Fed. Rep. of Germany

[21] Appl. No.: 990,282

[22] Filed: Dec. 14, 1992

[30] Foreign Application Priority Data

Dec. 23, 1991 [DE] Fed. Rep. of Germany ....... 4142763

[51] Int. Cl.$^5$ ............................................. C08G 65/38
[52] U.S. Cl. .................... 528/219; 528/205; 528/214; 528/212; 528/217; 525/151; 525/152
[58] Field of Search ............... 528/219, 212, 205, 214, 528/217; 525/151, 152

[56] References Cited

U.S. PATENT DOCUMENTS

| | | | |
|---|---|---|---|
| 3,644,537 | 2/1972 | Dannels et al. | 528/205 |
| 4,639,496 | 1/1987 | Weddigen et al. | 528/138 |
| 5,021,522 | 6/1991 | Durairaj et al. | 525/502 |
| 5,071,943 | 12/1991 | Abele et al. | 528/205 |
| 5,219,976 | 6/1993 | Abele et al. | 528/86 |

FOREIGN PATENT DOCUMENTS

| | | | |
|---|---|---|---|
| 444275 | 9/1991 | European Pat. Off. | B60C 1/00 |
| 0444275 | 9/1991 | European Pat. Off. | |
| 0444277 | 9/1991 | European Pat. Off. | |

*Primary Examiner*—John Kight, III
*Assistant Examiner*—Richard Jones
*Attorney, Agent, or Firm*—Connolly & Hutz

[57] ABSTRACT

Rubber components of a vulcanizable rubber composition are homogenized by adding to the composition, prior to vulcanization, a phenolic resin formed by reacting a bisphenol A residual resin with chlorinated $C_4$ to $C_8$ hydrocarbons in the presence of a Friedel-Crafts alkylation catalyst.

1 Claim, No Drawings

PHENOLIC RESINS FROM BISPHENOL A RESIDUAL RESINS AND MIXTURES OF CHLORO-SUBSTITUTED HYDROCARBONS, AND THE USE OF SPECIFIC PHENOLIC RESINS AS HOMOGENIZERS FOR RUBBER VULCANIZATES

This invention relates to anew-curable novalak-like phenolic resins from residual resins from bisphenol A production and mixtures of at least partially chlorosubstituted $C_4$–$C_8$ hydrocarbons (by-products of butadiene chlorination) as well as their use as homogenizers for rubber vulcanizates.

As is known, novolaks are non-self-curing polyphenols that are fusible and soluble in a range of organic solvents and whose aromatic nuclei are coupled by alkylidene groups. They can be produced from phenols and carbonyl compounds in presence of acidic catalysts, a molecular ratio of carbonyl compound to phenol of no more than 1, preferably no more than 0.75, usually being observed; cf. "Methoden der Organischen Chemie" (Houben-Weyl), vol. 14/2, Georg Thieme Verlag, Stuttgart 1963, pp. 193 ff.

As "novolak-like phenolic resins" in the sense of the invention there should be understood phenolic resins whose coupling linkages are not restricted to alkylidene groups, but which are essentially free from groups capable of self-crosslinking and therefore above all free from hydroxymethyl groups.

During the production of chloroprene by chlorination of butadiene there are formed, besides chloroprene, unwanted by-products with 4 to 8, preferably 4 or 8, C atoms and at least 3, preferably at least 4, functional groups from the range consisting of chlorine atoms and $C=C$ double bonds. Typical by-products consist of mixtures of 20 to 60 wt% 1,2,3,4-tetrachlorobutane, 10–60 wt % dichlorooctadienes, 3 to 20 wt % trichlorobutenes, 2 to 8 wt % tetrachlorooctenes and up to 15 wt % dichlorobutenes, dichlorobutanes and hexachlorobutanes. The clean separation of the individual components from these mixtures by distillation is not possible owing to their closely adjacent boiling points; for this reason, the by-products have not hitherto been further used, but burnt.

In the production of bisphenol A from acetone and phenol there are formed, in addition to p,p-bisphenol A, unwanted by-products with 1 to 4, preferably 1 to 3, phenolic OH groups. Typical residual resins after isolation of the p,p-bisphenol A consist of mixtures of 5 to 20 wt % phenol, 1 to 37 wt % bisphenols, 5 to 40 wt % chromanes, 1 to 25 wt % indanes, 1 to 20 wt % trisphenols and up to 10 wt % of other products in small proportions. The clean separation of the individual components from these mixtures by crystallization is not possible; for this reason, it is difficult to use these by-products further.

The subject of the invention was therefore to avoid burning, which is economically and ecologically undesirable, and to convert all components of the by-product mixtures into valuable products.

Surprisingly, it has now been found that the specified byproducts of chloroprene production can be reacted with the specified residual resins of bisphenol A production using suitable catalysts, so that the phenolic resin obtained can be isolated after removing the volatile components and, if applicable, solvent, without considering its heterogeneous structural elements while dispensing with expensive purification stages. It was also found that such novolak-like phenolic resins are outstandingly suitable as homogenizers for rubber vulcanizates and give products with improved adhesion and better tackiness.

The reaction of unsaturated hydrocarbons with phenols to phenolic resins is known from the patent U.S. Pat. No. 3 644 537; but there neither did the problem exist of reacting mixtures of different components nor are iron catalysts mentioned.

The production of phenolic resins from phenols and mixtures of chloro-substituted hydrocarbons (EP 444 274) and their use as stiffening resins in rubber vulcanizates (U.S. Pat. No. 3,625,874) have previously been described.

A subject matter of the invention is therefore new novolak-like phenolic resins from the reaction of bisphenol A residual resins with mixtures of at least partially chloro-substituted $C_4$–$C_8$ hydrocarbons in presence of catalysts suitable for Friedel-Crafts alkylations.

Another subject matter of the invention is the use as homogenizers for rubber vulcanizates of phenolic resins obtainable by Friedel-Crafts alkylation of A) at least one phenol or bisphenol A resin with B) at least one compound with 4 to 8 C atoms and 2 to 4, preferably 3 or 4, functional groups from the range of chlorine atoms and $C=C$ double bonds.

Preferred phenols A comprise mono- and dihydric mononuclear phenols that have no other substituents apart from the phenolic hydroxyl groups, such as unsubstituted phenol itself, catechol, resorcinol and hydroquinone; monohydric $C_1$–$C_6$ alkylphenols such as cresols, xylenols, ethylphenols, propylphenols and hexylphenols; monohydric phenylphenols such as hydroxybiphenyls; mono- and binuclear $C_6$–$C_{18}$ bisphenols such as dihydroxybiphenyls, bis(4-hydroxyphenyl)methane, 2,2-bis(4-hydroxyphenyl)propane and bis(4-hydroxyphenyl)sulphide or mixtures containing these phenols.

Especially preferred is a mixture of one or several phenols and a residual resin from a normal production of bisphenol A from acetone and phenol, consisting of 5 to 20 wt % phenol, 1 to 37 wt % bisphenols, 5 to 40 wt % chromanes, 1 to 25 wt % indanes, 1 to 20 wt % trisphenols and up to 10 wt % other products in small proportions (the proportions of the components total 100 wt % in each case).

The by-products apart from chloroprene arising from chloroprene production by chlorination of butadiene contain 4 to 8, preferably 4 or 8, C atoms and at least 3, preferably at least 4, functional groups from the range consisting of chlorine atoms and $C=C$ double bonds. Typical by-products consist of mixtures of 20 to 60 wt % 1,2,3,4-tetrachlorobutane, 10 to 60 wt % dichlorooctadienes, 3 to 20 wt % trichlorobutenes, 2 to 8 wt % tetrachlorooctenes and up to 15 wt % dichlorobutenes, dichlorobutanes and hexachlorobutanes. The chlorine content of such mixtures is usually 40 to 70 wt %, preferably 45 to 60 wt %, based on the mixture. These specified by-product mixtures are outstandingly suitable as compounds B in the sense of this invention. The individual components—irrespective of their origin—as well as mixtures of these components and also by-product mixtures concentrated by distillation are obviously also suitable for this purpose.

To produce the phenolic resins to be used according to the invention, the starting materials are usually charged in accordance with an equivalent ratio of phenolic OH of the phenols and/or of the bisphenol A resin A to the functional groups of compounds B (chlorine or C=C double bond) of 1:10 to 10:1, preferably 1:4 to 8:1, especially 1:2 to 5:1.

Suitable catalysts for production of the phenolic resins to be used according to the invention comprise all chemical substances that accelerate Friedel-Crafts alkylations, and therefore protonic acids and Lewis acids, such as e.g. sulphuric acid, hydrogen chloride, phosphoric acid, aluminium chloride, metallic iron as well as compounds of iron, preferably of di- and trivalent iron, such as e.g. the bromides, the nitrates, the sulphates, the oxalates, especially the chlorides, tin chloride, boron trifluoride, titanium tetrachloride, zinc chloride and zinc sulphate. Zinc and iron salts are preferred; iron trichloride is especially preferred. The reaction can also be carried out without catalyst addition, since the hydrogen chloride formed during the reaction also has a catalytic effect.

Normal catalyst quantities for salts are generally about 0.05 to 10 wt %, preferably 0.1 to 3 wt %, and for acids generally about 0.05 to 10 wt %, preferably 0.1 to 5 wt %, based on compounds B.

The process for production of the phenolic resins for use according to the invention is preferably carried out in the absence of solvents. It is, however, easily possible to use in addition under reaction conditions inert organic solvents, preferably those with a boiling point above 120° C., especially above 180° C., such as nitrobenzene, dichlorobenzenes, benzonitrile and chloronaphthalenes. If it is desired to carry out the process in solution, the organic solvent will be charged in amounts of 5 to 100 wt%, based on the sum of phenol A and compounds B.

The process is exothermic and, as soon as it is under way, can therefore proceed without external heat supply. In order to achieve a complete a reaction as possible and accordingly the lowest possible chlorine content in the final product, it may be useful after completing the addition of the components to leave the reaction mixture for a further 2 to 20 hours at temperatures of 40° to 280° C., preferably 80° to 250° C., especially 120° to 220° C.: the cessation of hydrogen chloride evolution shows that the reaction is at an end.

In practice, the process can be carried out by charging the molten phenol and/or bisphenol A resin A and the catalyst and metering in the mixture B, optionally dissolved in organic solvent. In order to obtain a good intermixture of the components, the mixture can be stirred. After completion of the reaction, solvent (if present), excess phenols and other volatile components can be removed, preferably by distillation, optionally at reduced pressure. The distillate obtained hereby can be reused for further reactions.

In order to obtain the lowest possible chlorine content in the residual resin, it can be useful after reaction is complete to carry out an extraction with water or to add chloride-releasing compounds such as e.g. phosphoric acid, phosphorous acids, polyphosphoric acids, phosphonic acids, phosphites, polycarboxylic acids, phthalic acids, carboxylic acids or sulphuric acid and only then to carry out the distillation.

The phenolic resins to be used according to the invention contain, per mole of units derived from phenol and/or bisphenol A resin A, 0.2 to 1, preferably 0.4 to 0.8, mole of units derived from component B.

The phenolic resins to be used according to the invention generally have softening points (according to DIN 53 244) of 50° to 200° C., OH values of 100 to 550 and number-average molecular weights $\overline{M}_n$ of 250 to 2000 (determined by vapour-phase osmometry in methanol and in acetone, the lower value being regarded as correct).

The phenolic resins described are used according to the invention as homogenizers for rubber vulcanizates. These vulcanizates can be based on natural and synthetic rubbers as well as preferably blends thereof.

Preferred synthetic rubbers are described for example in W. Hofmann, Kautschuk-Technologie, Gentner Verlag, Stuttgart 1980. They include among others BR—polybutadiene
ABR—butadiene/acrylic acid $C_1$-$C_4$ alkyl ester copolymers with acrylate ester contents of 5 to 60 wt, preferably 15 to 50 wt
CR—polychloroprene
IR—polyisoprene
IIR—isobutylene/isoprene copolymers
SBR—styrene/butadiene copolymers with styrene contents of 1 to 60 wt %, preferably 20 to 50 wt %
NBR—butadiene/acrylonitrile copolymers with acrylonitrile contents of 5 to 60 wt %, preferably 10 to 50 wt %, as well as the corresponding partially or fully hydrogenated copolymers (HNBR)
EPDM—ethylene/propylene/diene copolymers
and mixtures of these rubbers.

The phenolic resins to be used according to the invention are especially suitable as homogenizers of mixtures of rubbers that are mutually incompatible or have a small mutual compatibility and are used in the manufacture of tires and technical articles.

Rubbers have glass transition temperatures below 20° C., preferably below 0° C., determined in the torsion vibration test according to DIN 53 445. The dosage of the phenolic resins is ca. 1 to 50 wt %, preferably 3 to 15 wt %, relative to the rubber.

The vulcanization can be carried out in presence of normal vulcanizing agents: examples of these include elementary sulphur, sulphur donors, ethylene thiourea, cyclic thiuram disulphides, peroxides, crosslinker resins, quinone derivatives, diisocyanates, dithionites, bifunctional Bunte salts, diazo compounds, dinitroso compounds, nitrenes, dithiols, bisnitrilimines and bishydrosilanes.

Apart from the Vulcanizing agents, vulcanization accelerators are usually used, such as e.g. thiuram derivatives, guanidine accelerators, mercapto accelerators and sulphenamide accelerators (thiazol derivatives), besides activators such as zinc oxide, magnesium oxide and calcium oxide, as well as fatty acids such as e.g. stearic acid.

Fillers can be used in addition in the usual way. The preferred filler is carbon black. Plasticizers such as e.g. mineral oil can also be used. The nature and amount of the fillers and plasticizers are so chosen that the hardness of the vulcanizates as well as the other desired properties, such as e.g. abrasion, skid resistance and hysteresis, meet the practical requirements.

Stabilizers against thermal and oxidative attack can protect the vulcanizates from aging. Preferred stabilizers are sterically hindered phenol derivatives and derivatives of phenylenediamine as well as condensation products of anilines and ketones.

The use according to the invention leads to the improvement of some important mechanical properties of the vulcanizates, such as e.g. the tear propagation strength values and the 100% modulus. The homogenizer resins can be incorporated by means of the usual devices for the production of rubber mixes, e.g. with internal kneaders and roll mills.

The percentages in the following examples refer in each case to weight: parts are parts by weight.

EXAMPLES

The chlorohydrocarbon mixture used was a mixture of the by-products arising in butadiene chlorination, with a chlorine content of 55% and a C=C double bond content of 0.575 mole double bonds per 100 g product. The product mixture consisted approximately of 35% tetrachlorobutane, 40% dichlorooctadienes, 7% trichlorobutenes, 8% tetrachlorooctenes and 10% of other products in smaller proportions.

There was used as residual resins from a production of bisphenol A a mixture of about 11 wt % phenol, 37 wt % bisphenols, 26 wt % chromanes, 16 wt % indanes, 5 wt % trisphenol and 5 wt % of other products in smaller proportions.

EXAMPLE 1

To a melt of 360 g residual resin from bisphenol A production, 225 g phenol, 45 g isopropylphenol (distillate from a previous charge) and 3.6 g anhydrous ferric chloride there were added, dropwise with stirring at 125° C., 180 g of the chlorohydrocarbon mixture from butadiene chlorination, and HCl was evolved. Then the mixture was heated at 220° C. for a further 8 hours, cooled to 100° C. and neutralized with sodium hydroxide. After distilling off the volatile components (330 g) there remained as residue 385 g of a phenolic resin with softening point 108° C., OH value 236, acid value 3, and chlorine content 1.30 %.

EXAMPLE 2

This example was carried out like Example 1, but without neutralization. After removing 344 g distillate there remained as residue 358 g phenolic resin of softening point 116° C., OH value 236, acid value 10, and chlorine content 0.76%.

EXAMPLE 3

This example was carried out like Example 1, but with extraction with water instead of neutralization. After distilling off the volatile components (355 g) there remained as residue 378 g phenolic resin of softening point 105° C., OH value 224, acid value 3.5, and chlorine content 0.47 %.

EXAMPLE 4

This example was carried out like Example 1, but with the addition of 2.7 g phosphoric acid instead of neutralization. 320 g distillate were obtained and as residue 382 g phenolic resin of softening point 104° C., OH value 242, acid value 1.5, and chlorine content 0.40 %.

EXAMPLE 5

This example was carried out like Example 1, but with the addition as catalyst of 1.8 g anhydrous ferric chloride and 1.8 g anhydrous zinc chloride. 308 g distillate were obtained and as residue 399 g phenolic resin of softening point 90° C., OH value 245, acid value <1, and chlorine content 1.20 %.

APPLICATION

The following tests illustrate the use of the phenolic resins to be used according to the invention as homogenizers for rubber compounds or their vulcanizates.

For this purpose, the following test compounds, produced in two stages, were used. The first stage of production of the compound was carried out in an internal mixer (kneader). In this, the following components were mixed, the homogenizers used being a commercial bitumen resin (®Rhenosin 145; product of Rheinchemie Rheinau, Germany) or the phenolic resin from Example 1 (data in parts):

| | |
|---|---|
| Nitrile rubber (® Perbunan 3307; product of Bayer AG, Germany) | 70.0 |
| Ethylene propylene terpolymer (® Buna AP 451; product of Huls AG, Germany) | 30.0 |
| Zinc oxide WS | 5.0 |
| Stearic acid | 1.0 |
| Carbon black N 660 | 40.0 |
| Dioctyl phthalate | 10.0 |
| 2,2'-methylene-bis(4-methyl-6-tert.-butylphenol) (® Vulcanox BKF of Bayer AG) | 1.0 |
| Homogenizer resin | 5.0 |

After 5 minutes' mixing, the internal kneader was emptied and the complete compound prepared according to the following recipe from the first-stage compound on a roll mill coupled in series (data in parts):

| | |
|---|---|
| First-stage compound | 162 |
| Insoluble sulphur (® Rhenocure IS 90/G; product of Rheinchemie Rheinau, Germany) | 1.55 |
| Cyclohexylbenzthiazolesulphenamide (® Rhenogran CBS-80; product of Rheinchemie Rheinau, Germany) | 1.25 |
| Tetramethylthiuram disulphide (® Rhenogran TMTD-80; product of Rheinchemie Rheinau, Germany) | 0.25 |

The vulcanization of the complete mixtures was carried out for 15 minutes at 160° C. and yielded the following product properties:

| Tests: | Comparison I Homogenizer-resin-free vulcanizate | Comparison 2 Vulcanizate with bitumen resin ® Rhenosin 145 | Vulcanizate with resin from Example 1 |
|---|---|---|---|
| Hardness (Shore A) | 60 | 57 | 60 |
| 100% modulus (MPa) | 2.37 | 1.74 | 2.11 |
| Tensile strength at break (MPa) | 10.2 | 9.5 | 10.5 |
| Elongation at break (%) | 390 | 546 | 447 |
| Tear propagation strength (N/mm) | 20 | 18.7 | 22.9 |

The vulcanizates were aged for 7 hours at 100° C. in a circulating air oven.

The following table shows the results of the aging tests:

| Tests: | Comparison I Homogenizer-resin-free vulcanizate | Comparison 2 Vulcanizate with bitumen resin ®Rhenosin 145 | Vulcanizate with resin from Example 1 |
|---|---|---|---|
| Hardness (Shore A) | 66 + 10% | 62 + 9% | 65 + 8% |
| 100% modulus (MPa) | 3.81 + 61% | 2.43 + 10% | 3.73 + 77% |
| Tensile strength at break (Mpa) | 9.8 − 4% | 8.3 − 14% | 9.5 − 10% |
| Elongation at break (%) | 230 − 41% | 408 − 34% | 254 − 43% |
| Tear propagation strength (N/mm) | 16.4 − 18% | 18.6 +/− 0 | 19.3 − 16% |

A comparison of the results of the vulcanizate tests reveals that both before and after the aging the phenolic resins to be used according to the invention lead to products with an increased crosslinking density (see tear propagation strength values and Z100% modulus) and therefore show an excellent homogenizing action.

We claim:

1. In a process for improving the properties of a rubber vulcanizate by the addition of the reaction product of a phenolic with a mixture of partially chlorinated $C_4$ to $C_8$ hydrocarbons comprising the byproducts of butadiene chlorination in the presence of a Friedel-Crafts alkylation catalyst, the improvement which comprises employing as the phenolic a residual resin from the production of bisphenol A which contains phenol, bisphenols, chromanes, indanes and triphenols.

* * * * *